US008909523B2

(12) United States Patent
Kellermann et al.

(10) Patent No.: US 8,909,523 B2
(45) Date of Patent: Dec. 9, 2014

(54) METHOD AND ACOUSTIC SIGNAL PROCESSING SYSTEM FOR INTERFERENCE AND NOISE SUPPRESSION IN BINAURAL MICROPHONE CONFIGURATIONS

(75) Inventors: Walter Kellermann, Eckental (DE); Klaus Reindl, Erlangen (DE); Yuanhang Zheng, Erlangen (DE)

(73) Assignee: Siemens Medical Instruments Pte. Ltd., Singapore (SG)

( * ) Notice: Subject to any disclaimer, the term of this patent is extended or adjusted under 35 U.S.C. 154(b) by 855 days.

(21) Appl. No.: 13/154,738

(22) Filed: Jun. 7, 2011

(65) Prior Publication Data

US 2011/0307249 A1 Dec. 15, 2011

(30) Foreign Application Priority Data

Jun. 9, 2010 (EP) .................................... 10005957

(51) Int. Cl.

| | |
|---|---|
| ***G10L 15/20*** | (2006.01) |
| ***G10L 21/06*** | (2013.01) |
| ***H04R 25/00*** | (2006.01) |
| ***G10L 21/0208*** | (2013.01) |
| *G10L 21/0216* | (2013.01) |
| *H04R 3/00* | (2006.01) |

(52) U.S. Cl.

CPC ......... *G10L 21/0208* (2013.01); *H04R 2225/43* (2013.01); *G10L 2021/02165* (2013.01); *G10L 2021/02168* (2013.01); *H04R 3/005* (2013.01); *H04R 25/552* (2013.01); *H04R 2430/25* (2013.01); *H04R 2430/03* (2013.01); *H04R 25/407* (2013.01); *G10L 2021/065* (2013.01)

USPC ............ 704/233; 704/271; 381/313; 381/317

(58) Field of Classification Search

CPC .................................................... H04R 25/407

See application file for complete search history.

(56) References Cited

U.S. PATENT DOCUMENTS 5,400,409 A * 3/1995 Linhard .......................... 381/92
6,473,733 B1 * 10/2002 McArthur et al. ............ 704/224

(Continued)

OTHER PUBLICATIONS

Freudenberger, Jürgen, Sebastian Stenzel, and Benjamin Venditti. "A noise PSD and cross-PSD estimation for two-microphone speech enhancement systems." Statistical Signal Processing, 2009. SSP'09. IEEE/SP 15th Workshop on. IEEE, 2009.*

(Continued)

*Primary Examiner* — Brian Albertalli

(74) *Attorney, Agent, or Firm* — Laurence A. Greenberg; Werner H. Stemer; Ralph E. Locher

(57) ABSTRACT

A method determines a bias reduced noise and interference estimation in a binaural microphone configuration with a right and a left microphone signal at a time-frame with a target speaker active. The method includes a determination of the auto power spectral density estimate of the common noise formed of noise and interference components of the right and left microphone signals and a modification of the auto power spectral density estimate of the common noise by using an estimate of the magnitude squared coherence of the noise and interference components contained in the right and left microphone signals determined at a time frame without a target speaker active. An acoustic signal processing system and a hearing aid implement the method for determining the bias reduced noise and interference estimation. The noise reduction performance of speech enhancement algorithms is improved by the invention. Further, distortions of the target speech signal and residual noise and interference components are reduced.

14 Claims, 4 Drawing Sheets

(56) References Cited

U.S. PATENT DOCUMENTS

| | | | | |
|---|---|---|---|---|
| 7,953,596 | B2 * | 5/2011 | Pinto | 704/233 |
| 8,098,844 | B2 * | 1/2012 | Elko | 381/94.1 |
| 8,116,478 | B2 * | 2/2012 | Kim et al. | 381/92 |
| 8,121,311 | B2 * | 2/2012 | Hetherington | 381/93 |
| 8,195,246 | B2 * | 6/2012 | Vitte et al. | 455/570 |
| 8,238,575 | B2 * | 8/2012 | Buck et al. | 381/94.1 |
| 8,296,136 | B2 * | 10/2012 | Nongpiur | 704/228 |
| 8,392,184 | B2 * | 3/2013 | Buck et al. | 704/233 |
| 8,620,672 | B2 * | 12/2013 | Visser et al. | 704/500 |
| 8,660,281 | B2 * | 2/2014 | Bouchard et al. | 381/312 |
| 2003/0014248 | A1 * | 1/2003 | Vetter | 704/226 |
| 2008/0159559 | A1 * | 7/2008 | Akagi et al. | 381/92 |
| 2010/0166199 | A1 * | 7/2010 | Seydoux | 381/66 |

OTHER PUBLICATIONS

McCowan, lain A., and HervëBourlard. “Microphone array post-filter based on noise field coherence.” Speech and Audio Processing, IEEE Transactions on 11.6 (2003): 709-716.*

Carter, G. Clifford, C. Knapp, and Albert H. Nuttall. “Statistics of the estimate of the magnitute-coherence function.” Audio and Electroacoustics, IEEE Transactions on 21.4 (1973): 388-389.*

Guérin, Alexandre, Régine Le Bouquin-Jeannés, and Gérard Faucon. “A two-sensor noise reduction system: applications for hands-free car kit.” EURASIP Journal on Applied Signal Processing 2003 (2003): 1125-1134.*

Wittkop, Thomas, and Volker Hohmann. “Strategy-selective noise reduction for binaural digital hearing aids.” Speech Communication 39.1 (2003): 111-138.*

Zhang, Xuefeng, et al., “Decision Based Noise Cross Power Spectral Density Estimation for Two-Microphone Speech Enhancement Systems”, 2005, pp. 813-816, Intel China Research Center, Beijing, China.

Le Bouquin, Regine, et al., “On Using the Coherence Function for Noise Reduction”, Signal Processing V: Theories and Applications. Proceedings of EUSIPCO-90 Fifth European Signal Processing Conference, Sep. 18-21,1990, pp. 1103-1106, vol. 1, Elsevier, Amsterdam, Netherlands (ISBN: 978-0-444-88636-1).

Hu, Rong, et al., “Fast Noise Compensation for Speech Separation in Diffuse Noise”, Acoustics, Speech and Signal Processing, ICASSP Proceedings, 2006 IEEE International Conference in Toulouse, France, pp. 866, IEEE, Piscataway, NJ, USA (ISBN: 978-1-4244-0469-8).

Reindl, K., et al., “Speech Enhancement for Binaural Hearing Aids Based on Blind Source Separation”, Proceedings of the 4th International Symposium on Communication, ISCSP, Mar. 3-5, 2010, pp. 1-6.

European Patent Office Search Report, dated Sep. 20, 2010.

* cited by examiner

METHOD AND ACOUSTIC SIGNAL PROCESSING SYSTEM FOR INTERFERENCE AND NOISE SUPPRESSION IN BINAURAL MICROPHONE CONFIGURATIONS

CROSS-REFERENCE TO RELATED APPLICATION

This application claims the priority, under 35 U.S.C. §119, of European patent application EP 10005957, filed Jun. 9, 2010; the prior application is herewith incorporated by reference in its entirety.

BACKGROUND OF THE INVENTION

Field of the Invention

The present invention relates to a method and an acoustic signal processing system for noise and interference estimation in a binaural microphone configuration with reduced bias. Moreover, the present invention relates to a speech enhancement method and hearing aids.

Until recently, only bilateral speech enhancement techniques were used for hearing aids, i.e., the signals were processed independently for each ear and thereby the binaural human auditory system could not be matched. Bilateral configurations may distort crucial binaural information as needed to localize sound sources correctly and to improve speech perception in noise. Due to the availability of wireless technologies for connecting both ears, several binaural processing strategies are currently under investigation. Binaural multichannel Wiener filtering approaches preserving binaural cues for the speech and noise components are state of the art. For multi-channel techniques determining the noise components in each individual microphone is desirable. Since, in practice, it is almost impossible to obtain these separate noise estimates, the combination of a common noise estimate with single-channel Wiener filtering techniques to obtain binaural output signals is investigated.

FIG. 1 depicts a well known system for blind binaural signal extraction and a two microphone setup (M1, M2). Hearing aid devices with a single microphone at each ear are considered. The mixing of the original sources $s_q[k]$ is modeled by a filter of length M denoted by an acoustic mixing system AMS.

This leads to the microphone signals $x_p[k]$ $$x_p[k] = \sum_{q=1}^{Q} \sum_{\kappa=0}^{M-1} h_{qp}[\kappa] s_q[k-\kappa] + n_{b_p}[k],\ p \in \{1, 2\}, \tag{1}$$

where $h_{qp}[k]$, k=0, . . . , M−1 denote the coefficients of the filter model from the q-th source $s_q[k]$, q=1, . . . , Q to the p-th sensor $x_p[k]$, p∈{1, 2}. The filter model captures reverberation and scattering at the user's head. The source $s_1[k]$ is seen as the target source to be separated from the remaining Q−1 interfering point sources $s_q[k]$, q=2, . . . , Q and babble noise denoted by $n_{bp}[k]$, p∈{1, 2}. In order to extract desired components from the noisy microphone signals $x_p[k]$, a reliable estimate for all noise and interference components is necessary. A blocking matrix BM forces a spatial null to a certain direction $\phi_{tar}$, which is assumed to be the target speaker location to assure that the source signal $s_1[k]$ arriving from that direction can be suppressed well. Thus, an estimate for all noise and interference components is obtained which is then used to drive speech enhancement filters $w_i[k]$, i∈{1, 2}. The enhanced binaural output signals are denoted by $y_i[k]$, i∈{1, 2}.

For all speech enhancement algorithms a good noise estimate is the key for the best possible noise reduction. For binaural hearing aids and a two-microphone setup, the easiest way to obtain a noise estimate is to subtract both channels $x_1[k]$, $x_2[k]$ assuming that the desired signal component is the same in both channels. There are also more sophisticated solutions that can also deal with reverberation. Generally, the noise estimate ñ[v,n] is given in the time-frequency domain by $$\tilde{n}[v, n] = \sum_{p=1}^{2} b_p[v, n] \cdot x_p[v, n] = \sum_{p=1}^{2} v_p[v, n], \tag{2}$$

where v and n denote the frequency band and the block index, respectively. $b_p[v,n]$, p∈{1, 2} denoteS the spectral weights of the blocking matrix BM. Since with such blocking matrices only a common noise estimate ñ[v,n] is available it is essential to compute a single speech enhancement filter applied to both microphone signals $x_1[k]$, $x_2[k]$. A well-known single Wiener filter approach is given in the time-frequency domain by $$w[v, n] = w_1[v, n] = w_2[v, n] = 1 - \mu \frac{\hat{S}_{\tilde{n}\tilde{n}}[v, n]}{\hat{S}_{v_1 v_1}[v, n] + \hat{S}_{v_2 v_2}[v, n]}, \tag{3}$$

where μ is a real number and can be chosen to achieve a trade-off between noise reduction and speech distortion. $\hat{S}_{\tilde{n}\tilde{n}}[v,n]$ and $\hat{S}_{v_p v_p}[v,n]$, p∈{1, 2} denote auto power spectral density (PSD) estimates from the estimated noise signal ñ[v,n] and the filtered microphone signals. The microphone signals are filtered with the coefficients of the blocking matrix according to equation 2.

The noise estimation procedures (e.g. subtracting the signals from both channels $x_1[k]$, $x_2[k]$ or more sophisticated approaches based on blind source separation) lead to an unavoidable systematic error (=bias).

SUMMARY OF THE INVENTION

It is accordingly an object of the invention to provide a method and acoustic signal processing system for interference and noise suppression in binaural microphone configurations which overcome the above-mentioned disadvantages of the heretofore-known devices and methods of this general type and which provide for noise and interference estimation in a binaural microphone configuration with reduced bias. It is a further object to provide a related speech enhancement method and a related hearing aid.

With the foregoing and other objects in view there is provided, in accordance with the invention, a method for a bias reduced noise and interference estimation in a binaural microphone configuration with a right and a left microphone signal at a timeframe with a target speaker active. The method comprises the following method steps:

determining the auto power spectral density estimate of a common noise estimate comprising noise and interference components of the right and left microphone signals and modifying the auto power spectral density estimate of the common noise estimate by using an estimate of the magnitude squared coherence of the noise and interference components contained in the right and left microphone signals determined at a time frame without a target speaker active.

The method uses a target voice activity detection and exploits the magnitude squared coherence of the noise components contained in the individual microphones. The magnitude squared coherence is used as criterion to decide if the estimated noise signal obtains a large or a weak bias.

According to a further preferred embodiment of the method, the magnitude squared coherence (MSC) is calculated as $$MSC = \frac{|\hat{S}_{v,n_1v,n_2}|^2}{\hat{S}_{v,n_1v,n_1}\hat{S}_{v,n_2v,n_2}},$$

where $\hat{S}_{v,n_1n_2}$ is the cross power spectral density of the by a blocking matrix filtered noise and interference components contained in the right and left microphone signals, $\hat{S}_{v,n_1v,n_1}$ is the auto power spectral density of the by said blocking matrix filtered noise and interference components contained in the right microphone signal and $\hat{S}_{v,n_2V,n_2}$ is the auto power spectral density of the by said blocking matrix filtered noise and interference components contained in the left microphone signal.

In accordance with an additional feature of the invention, the bias reduced auto power spectral density estimate $\hat{S}_{\hat{n}\hat{n}}$ of the common noise is calculated as $$\hat{S}_{\hat{n}\hat{n}}=MSC\cdot(\hat{S}_{v,n_1v,n_1}+\hat{S}_{v,n_2v,n_2})+(1-MSC)\cdot\hat{S}_{\tilde{n}\tilde{n}},$$

where $\hat{S}_{\tilde{n}\tilde{n}}$ is the auto power spectral density estimate of the common noise estimate.

In accordance with an additional feature of the invention, the above object is solved by a further method for a bias reduced noise and interference estimation in a binaural microphone configuration with a right and a left microphone signal. At timeframes during which a target speaker is active, the bias reduced auto power spectral density estimate is determined according to the method for a bias reduced noise and interference estimation according to the invention and at time frames during which the target speaker is inactive, the bias reduced auto power spectral density estimate is calculated as $\hat{S}_{\hat{n}\hat{n}}=\hat{S}_{v,n_1v,n_1}+\hat{S}_{v,n_2v,n_2}$.

In accordance with a preferred embodiment of the invention, the bias reduced auto power spectral density estimate is determined in different frequency bands.

According to the present invention, the above object is further solved by a method for speech enhancement with a method described above, wherein the bias reduced auto power spectral density estimate is used for calculating filter weights of a speech enhancement filter.

With the above and other objects in view there is also provided, in accordance with the invention, an acoustic signal processing system for a bias reduced noise and interference estimation at a timeframe in which a target speaker is active with a binaural microphone configuration comprising a right and left microphone with a right and a left microphone signal. The system comprises:

a power spectral density estimation unit determining the auto power spectral density estimate of the common noise estimate comprising noise and interference components of the right and left microphone signals; and a bias reduction unit modifying the auto power spectral density estimate of the common noise estimate by using an estimate of the magnitude squared coherence of the noise and interference components contained in the right and left microphone signals determined at a time frame without a target speaker active.

According to a further preferred embodiment of the acoustic signal processing system, the bias reduced auto power spectral density estimate $\hat{S}_{\hat{n}\hat{n}}$ of the common noise is calculated as $$\hat{S}_{\hat{n}\hat{n}}=MSC\cdot(\hat{S}_{v,n_1v,n_1}+\hat{S}_{v,n_2v,n_2})+(1-MSC)\cdot\hat{S}_{\tilde{n}\tilde{n}}.$$

where $\hat{S}_{\tilde{n}\tilde{n}}$ is the auto power spectral density estimate of the common noise.

In accordance with again an added feature of the invention, the acoustic signal processing system further comprises a speech enhancement filter with filter weights which are calculated by using the bias reduced auto power spectral density estimate.

With the above and other objects in view there is also provided, in accordance with the invention, a hearing aid with an acoustic signal processing system as outlined above.

Finally, there is provided a computer program product with a computer program which comprises software means for executing a method for bias reduced noise and interference estimation according to the invention, if the computer program is executed in a processing unit.

The invention offers the advantage over existing methods that no assumption about the properties of noise and interference components is made. Moreover, instead of introducing heuristic parameters to constrain the speech enhancement algorithm to compensate for noise estimation errors, the invention directly focuses on reducing the bias of the estimated noise and interference components and thus improves the noise reduction performance of speech enhancement algorithms. Moreover, the invention helps to reduce distortions for both, the target speech components and the residual noise and interference components.

The above described methods and systems are preferably employed for the speech enhancement in hearing aids. However, the present application is not limited to such use only. The described methods can rather be utilized in connection with other binaural/dual-channel audio devices.

Other features which are considered as characteristic for the invention are set forth in the appended claims.

Although the invention is illustrated and described herein as embodied in a method and acoustic signal processing system for interference and noise suppression in binaural microphone configurations, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
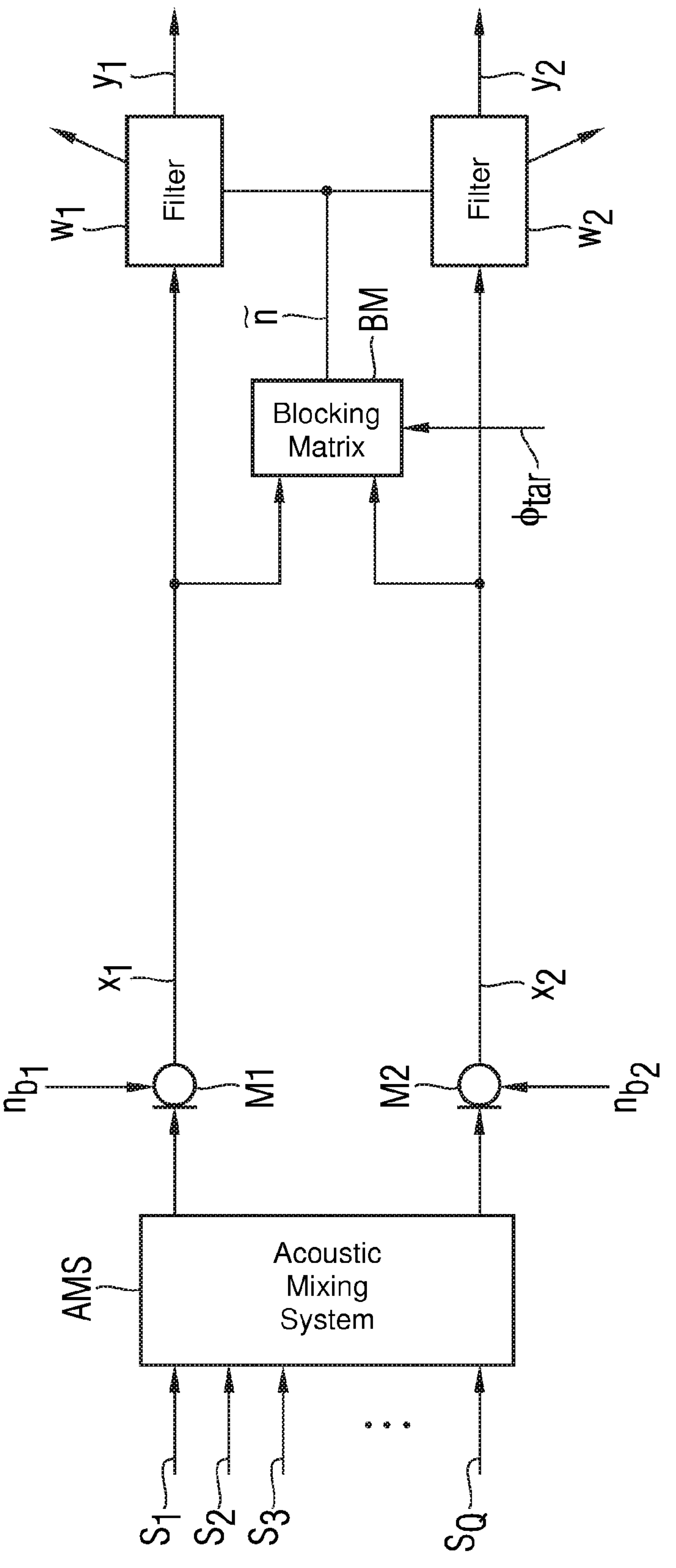
FIG 1 PRIOR ART
FIG. 1 a block diagram of an acoustic signal processing system for binaural noise reduction without bias correction according to prior art, FIG. 2 a block diagram of an acoustic signal processing system for binaural noise reduction with bias correction, FIG. 3 an overview about four test scenarios and FIG. 4 a diagram of SIR improvement for the invented system depicted in FIG. 2.

The core of the invention is a method to obtain a noise PSD estimate with reduced bias.

In the following, for the sake of clarity, the block index n as well as the subband index v are omitted. Assuming that the necessary noise estimate ñ is obtained by equation 2, equation 3 can be written in the time-frequency domain as $$w = 1 - \mu \frac{\sum_{q=2}^{Q} \left(|b_1|^2|h_{q1}|^2 + |b_2|^2|h_{q2}|^2 + 2\Re\{b_1 b_2^* h_{q1} h_{q2}^*\}\right) \cdot \hat{S}_{s_q s_q}}{\sum_{q=1}^{Q} (|b_1|^2\,|h_{q1}|^2 + |b_2|^2\,|h_{q2}|^2) \cdot \hat{S}_{s_q s_q}}, \tag{4}$$

where $h_{qp}$ denotes the spectral weight from source q=1, . . . , Q to microphone p, p∈{1, 2} for the frequency band v. $s_1$ is assumed to be the desired source and $s_q$, q=2, . . . , Q denote interfering point sources. By equation (4), an optimum noise suppression can only be achieved if the noise components in the numerator are the same as in the denominator. Assuming an optimum desired speech suppression by the blocking matrix BM and defining $s_1$ as desired speech signal to be extracted from the noisy signal $x_p$, p∈{1, 2}, we derive a noise PSD estimation bias $\Delta\hat{S}_{\tilde{n}\tilde{n}}$. The common noise PSD estimate $\hat{S}_{\tilde{n}\tilde{n}}$ is identified from equations 2, 3, and 4 as $$\hat{S}_{\tilde{n}\tilde{n}} = \sum_{q=2}^{Q} (|b_1|^2\,|h_{q1}|^2 + |b_2|^2\,|h_{q2}|^2 + 2\Re\{b_1 b_2^* h_{q1} h_{q2}^*\}) \cdot \hat{S}_{s_q s_q}. \tag{5}$$

Applying the well-known standard Wiener filter theory to equation (4), the optimum noise estimate $\hat{S}_{n_o n_o}$ that would be necessary to achieve a best noise suppression reads however $$\hat{S}_{n_o n_o} = \sum_{q=2}^{Q} (|b_1|^2\,|h_{q1}|^2 + |b_2|^2\,|h_{q2}|^2) \cdot \hat{S}_{s_q s_q}. \tag{6}$$

The estimated bias $\Delta\hat{S}_{\tilde{n}\tilde{n}}$ is then given as the difference between the obtained common noise PSD estimate $\hat{S}_{\tilde{n}\tilde{n}}$ and the optimum noise PSD estimate $\hat{S}_{n_o n_o}$ and reads $$\Delta\hat{S}_{\tilde{n}\tilde{n}} = \hat{S}_{\tilde{n}\tilde{n}} - \hat{S}_{n_o n_o} = \sum_{q=2}^{Q} 2\Re\{b_1 b_2^* h_{q1} h_{q2}^*\} \cdot \hat{S}_{s_q s_q}. \tag{7}$$

From equation (7) it can be seen that the noise PSD estimation bias $\Delta\hat{S}_{\tilde{n}\tilde{n}}$ is described by the correlation of the noise components in the individual microphone signals $x_1$, $x_2$. As long as the correlation of the noise components in the individual channels $x_1$, $x_2$ is high, this bias $\Delta\hat{S}_{\tilde{n}\tilde{n}}$ is also high. Only for ideally uncorrelated noise components, the bias $\Delta\hat{S}_{\tilde{n}\tilde{n}}$ will be zero. As the noise PSD estimation bias $\Delta\hat{S}_{\tilde{n}\tilde{n}}$ is signal-dependent (equation (7) depends on the PSD estimates of the source signals $\hat{S}_{s_q s_q}$) and the signals are highly non-stationary as we consider speech signals, equation (7) can hardly be estimated at all times and all frequencies. Only if the target speaker $s_1$ is inactive, the noise PSD estimation bias $\Delta\hat{S}_{\tilde{n}\tilde{n}}$ can be obtained as the microphone signals $x_1$, $x_2$ contain only noise and interference components and thus the bias of the noise PSD estimate $\hat{S}_{\tilde{n}\tilde{n}}$ can be reduced.

In order to obtain a bias reduced noise PSD estimate $\hat{S}_{\tilde{n}\tilde{n}}$ even if the target speaker $s_1$ is active, reliable parameters related to the noise PSD estimation bias $\Delta\hat{S}_{\tilde{n}\tilde{n}}$ that can be applied even if the target speaker is active, need to be estimated. This is important as speech signals are considered as interference which are highly non-stationary signals. Thus it is not sufficient to estimate the noise PSD estimation error $\Delta\hat{S}_{\tilde{n}\tilde{n}}$ during target speech pauses only.

According to the invention, a valuable quantity is the well-known Magnitude Squared Coherence (MSC) of the noise components. On the one hand, if the MSC is low (close to zero), then $\Delta\hat{S}_{\tilde{n}\tilde{n}}$ (equation 7) is low, since the cross-correlation between the noise components in the right and left channels $x_1$, $x_2$ is weak. On the other hand, if the MSC is close to one, the noise PSD estimation bias $|\Delta\hat{S}_{\tilde{n}\tilde{n}}|$ (equation 7) becomes quite high as the noise components contained in the microphone signals $x_1$, $x_2$ are strongly correlated. Using the MSC it is possible to decide whether the common noise estimate exhibits a strong or a low bias $\Delta\hat{S}_{\tilde{n}\tilde{n}}$.

In summary, a noise PSD estimate $\hat{S}_{\tilde{n}\tilde{n}}$ with reduced bias can be obtained by:

- using the microphone signals $x_2$ as noise and interference estimate during target speech pauses; and
- applying the MSC of the noise and interference components of the microphone signals estimated during target speech pauses to decide whether the common noise estimate exhibits a strong or a low bias.

We now describe the way how to reduce the bias $\Delta\hat{S}_{\tilde{n}\tilde{n}}$ if the target speaker is active and the MSC is close to one will be discussed next. First of all, a target Voice Activity Detector VAD for each time-frequency bin is necessary (just as in standard single-channel noise suppression) to have access to the quantities described previously. If the target speaker is inactive ($s_1 \equiv 0$), the by BM filtered microphone signals $x_1$, $x_2$ can directly be used as noise estimate. The PSD estimate $\hat{S}_{v_p v_p}$ of the filtered microphone signals is then given by $$\hat{S}_{v_p v_p} = \hat{S}_{v,n_p v,n_p} = \sum_{q=2}^{Q} |b_p|^2\,|h_{qp}|^2\,\hat{S}_{s_q s_q} \quad p\in\{1, 2\}, \tag{8}$$

where $\hat{S}_{v,n_p v,n_p}$ describes the by the blocking matrix BM filtered noise components of the right and left channel $x_1$, $x_2$, respectively. Thus, the noise PSD estimate with reduced bias $\hat{S}_{\tilde{n}\tilde{n}}$ is given by $$\hat{S}_{\tilde{n}\tilde{n}} = \hat{S}_{v,n_1 v,n_1} + \hat{S}_{v,n_2 v,n_2} \tag{9}$$

Moreover, during target speech pauses, the MSC of the noise components in the right and left channel $x_1$, $x_2$ is estimated. The estimated MSC is applied to decide whether the common noise PSD estimate $\hat{S}_{\tilde{n}\tilde{n}}$ (equation 5) exhibits a strong or a low bias. The MSC of the filtered noise components in the right and left channel $x_1$, $x_2$ is given by $$MSC = \frac{|\hat{S}_{v,n_1 v,n_2}|^2}{\hat{S}_{v,n_1 v,n_1}\,\hat{S}_{v,n_1 v,n_2}} \tag{10}$$

and is always in the range of 0≤MSC≤1. MSC=1 indicates ideally correlated signals whereas MSC=0 means ideally decorrelated signals. If the MSC is low, the common noise PSD estimate $\hat{S}_{\tilde{n}\tilde{n}}$ given by equation 5 is already an estimate with low bias and thus we can use:

$$\hat{S}_{\tilde{n}\tilde{n}}=\hat{S}_{\tilde{n}\tilde{n}}. \tag{11}$$

If the MSC is close to one, $\hat{S}_{\tilde{n}\tilde{n}}$ (equation 5) represents an estimate with strong bias, since $|\Delta\hat{S}_{\tilde{n}\tilde{n}}|$ (equation 7) becomes quite high. In this case, the following combination is proposed to obtain the bias reduced noise PSD estimate $\hat{S}_{\tilde{n}\tilde{n}}$:

$$\hat{S}_{\tilde{n}\tilde{n}}=MSC\cdot(\hat{S}_{v,n_1v,n_1}+\hat{S}_{v,n_2v,n_2})+(1-MSC)\cdot\hat{S}_{\tilde{n}\tilde{n}}, \tag{12}$$

where $\hat{S}_{v,n_1v,n_1}+\hat{S}_{v,n_2v,n_2}$ is an estimate taken from the most recent data frame with $s_1=0$. In general, the noise PSD estimate with reduced bias $\hat{S}_{\tilde{n}\tilde{n}}$ is given by $$\hat{S}_{\tilde{n}\tilde{n}}=\alpha\cdot(\hat{S}_{v,n_1v,n_1}+\hat{S}_{v,n_2v,n_2})+(1-\alpha)\cdot\hat{S}_{\tilde{n}\tilde{n}} \tag{13}$$

where $\alpha=1$ if the target speaker is inactive, otherwise $\alpha$=MSC. For obtaining $\hat{S}_{\tilde{n}\tilde{n}}$ obviously it is needed to estimate three different quantities, namely the MSC, a target VAD for each time-frequency bin, and an estimate of $\hat{S}_{v,n_1v,n_1}+\hat{S}_{v,n_2v,n_2}$.

Figure 2:
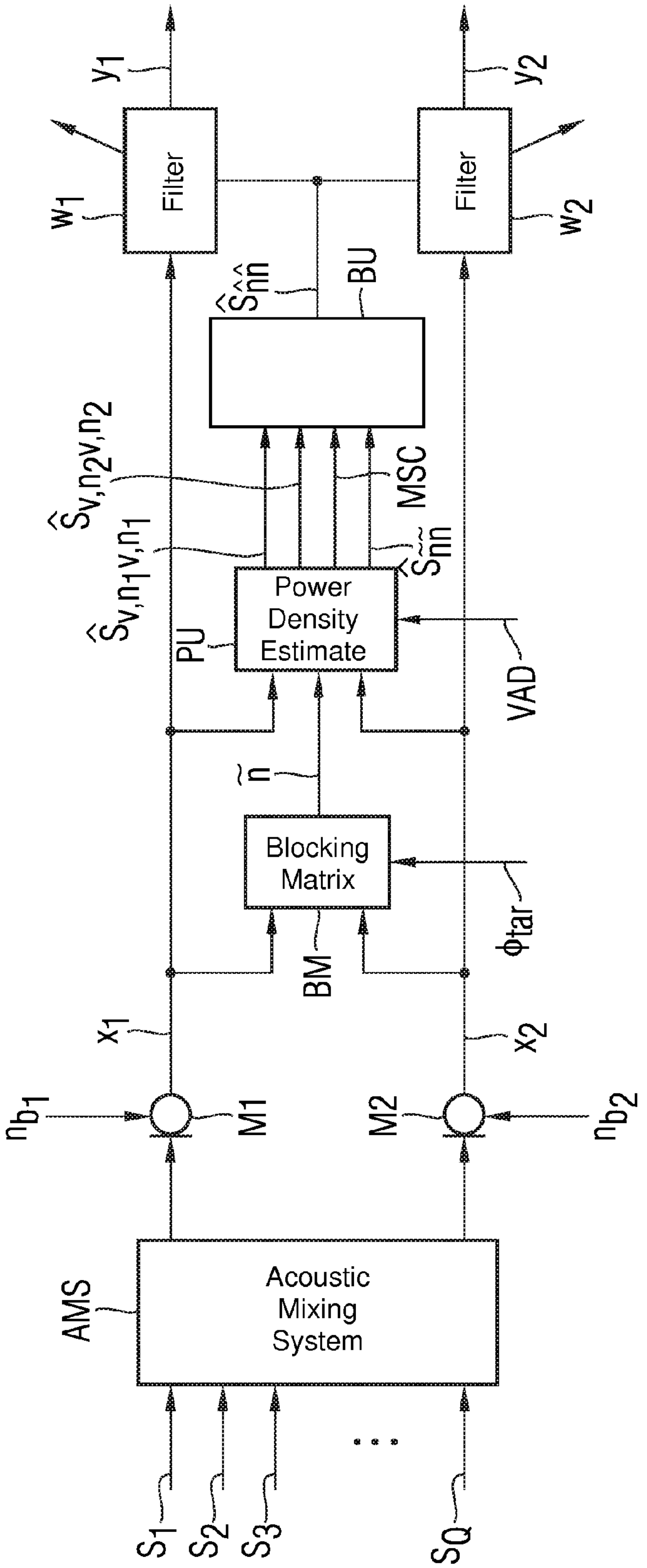

FIG. 2 shows a block diagram of an acoustic signal processing system for binaural noise reduction with bias correction according to the invention described above. The system for blind binaural signal extraction comprises a two microphone setup, a right microphone M1 and a left microphone M2. For example, the system can be part of binaural hearing aid devices with a single microphone at each ear. The mixing of the original sources $s_q$ is modeled by a filter denoted by an acoustic mixing system AMS. The acoustic mixing system AMS captures reverberation and scattering at the user's head. The source $s_1$ is seen as the target source to be separated from the remaining Q−1 interfering point sources $s_q$, q=2, . . . , Q and babble noise denoted by $n_{bp}$, $p\in\{1, 2\}$. In order to extract desired components from the noisy microphone signals $x_p$, a reliable estimate for all noise and interference components is necessary. A blocking matrix BM forces a spatial null to a certain direction $\Phi_{tar}$ which is assumed to be the target speaker location assuring that the source signal $s_1$ arriving from this direction can be suppressed well. The output of the blocking matrix BM is an estimated common noise signal ñ, an estimate for all noise and interference components.

The microphone signals $x_1$, $x_2$, the common noise signal ñ, and a voice activity detection signal VAD are used as input for a noise power density estimation unit PU. In the unit PU, the noise and interference PSD $\hat{S}_{v,n_pv,n_p}$, $p\in\{1, 2\}$ as well as the common noise PSD $\hat{S}_{\tilde{n}\tilde{n}}$ and the MSC are calculated. These calculated values are inputted to a bias reduction unit BU. In the bias reduction unit the common noise PSD $\hat{S}_{\tilde{n}\tilde{n}}$ is modified according to equation 13 in order to get a desired bias reduced common noise PSD $\hat{S}_{\tilde{n}\tilde{n}}$.

The bias reduced common noise PSD $\hat{S}_{\tilde{n}\tilde{n}}$ is then used to drive speech enhancement filters $w_1$, $w_2$ which transfer the microphone signals $x_1$, $x_2$ to enhanced binaural output signals $y_1$, $y_2$.

Estimation of the MSC

The estimate of the MSC of the noise components is considered to be based on an ideal VAD. The MSC of the noise components is in the time-frequency domain given by $$MSC[v,n]=\frac{|\hat{S}_{n_1n_2}[v,n]|^2}{\hat{S}_{n_1n_1}[v,n]\hat{S}_{n_2n_2}[v,n]}, \tag{14}$$

where v denotes the frequency bin and n is the frame index. $\hat{S}_{n_1n_2}$[v,n] represents the cross PSD of the noise components $n_1$[v,n] and $n_2$[v,n]. $\hat{S}_{n_pn_p}$[v,n], $p\in\{1, 2\}$ denotes the auto PSD of $n_p$[v,n], $p\in\{1, 2\}$. The noise components $n_p$[v,n], $p\in\{1, 2\}$ are only accessible during the absence of the target source, consequently, the MSC can only be estimated at these time-frequency points and is calculated by:

$$\overline{MSC}[v_I,n]=\frac{|\hat{S}_{v,n_1v,n_2}[v_I,n]|^2}{\hat{S}_{v,n_1v,n_1}[v_I,n]\hat{S}_{v,n_2v,n_2}[v_I,n]} \tag{15}$$

$$=\frac{|\hat{S}_{v_1v_2}[v_I,n]|^2}{\hat{S}_{v_1v_1}[v_I,n]\hat{S}_{v_2v_2}[v_I,n]}, \tag{16}$$

where $v,n_p[v_I,n]$, $p\in\{1, 2\}$ are the filtered noise components and $v_p[v_I,n]$, $p\in\{1, 2\}$ are the filtered microphone signals $x_1$, $x_2$. The time-frequency points $[v_I,n]$ represent the set of those time-frequency points where the target source is inactive, and, correspondingly, $[v_A,n]$ denote those time-frequency points dominated by the active target source. Note that here we use $v,n_p[v_I,n]$ instead of $n_p[v_I,n]$, since in equation 13 the coherence of the filtered noise components is considered. Besides, in order to have reliable estimates, the obtained $\overline{MSC}$ is recursively averaged with a time constant $0<\beta<1$:

$$\overline{MSC}[v_I,n]=\beta\cdot\overline{MSC}[v_I,n-1]+(1-\beta)\cdot\frac{|\hat{S}_{v_1v_2}[v_I,n]|^2}{\hat{S}_{v_1v_1}[v_I,n]\hat{S}_{v_2v_2}[v_I,n]}. \tag{17}$$

Since the noise components are not accessible at the time-frequency point of the active target source, $\overline{MSC}$ cannot be updated but keeps the value estimated at the same frequency bin of the previous frame:

$$\overline{MSC}[v_A,n]=\overline{MSC}[v_A,n-1]. \tag{18}$$

Estimation of the Separated Noise PSD

The second term to be estimated for equation 13 is the sum of the power of the noise components contained in the individual microphone signals. During target speech pauses, due to the absence of the target speech signal, there is access to these components getting $$\hat{S}_{v_1v_1}[v_I,n]+\hat{S}_{v_2v_2}[v_I,n]=\hat{S}_{v,n_1v,n_1}[v_I,n]+\hat{S}_{v,n_2v,n_2}[v_I,n].$$

Now, a correction function is introduced given by $$f_{Corr}[v_I,n]=\frac{\hat{S}_{v_1v_1}[v_I,n]+\hat{S}_{v_2v_2}[v_I,n]}{\hat{S}_{\tilde{n}\tilde{n}}[v_I,n]}. \tag{19}$$

This correction function $f_{Corr}[v_I,n]$ is then used to correct the original noise PSD estimate $\hat{S}_{\tilde{n}\tilde{n}}[v_I,n]$ to obtain an estimate of the separated noise PSD $\hat{S}_{v,n_1v,n_1}[v_I,n]+\hat{S}_{v,n_2v,n_2}[v_I,n]$ that is necessary for equation 13. Again, in order to obtain a reliable estimate of the correction function, the estimates are recursively averaged with a time constant $0<\gamma<1$:

$$f_{Corr}[v_I,n]=\gamma\cdot f_{Corr}[v_I,n-1]+(1-\gamma)\cdot\frac{\hat{S}_{v_1v_1}[v_I,n]+\hat{S}_{v_2v_2}[v_I,n]}{\hat{S}_{\tilde{n}\tilde{n}}[v_I,n]} \tag{20}$$

An estimate of $\hat{S}_{v,n_1v,n_1}[v_I,n]+\hat{S}_{v,n_2v,n_2}[v_I,n]$ can now be obtained by $$\hat{S}_{v,n_1v,n_1}[v_I,n]+\hat{S}_{v,n_2v,n_2}[v_I,n]=\hat{S}_{v_1v_1}[v_I,n]+\hat{S}_{v_2v_2}[v_I,n]=f_{Corr}[v_I,n]\cdot\hat{S}_{\tilde{n}\tilde{n}}[v_I,n]. \tag{21}$$

However, at the time-frequency points of active target speech $\hat{S}_{v_1v_1}[v_A,n]+\hat{S}_{v_2v_2}[v_A,n]+\hat{S}_{v,n_1v,n_1}[v_A,n]+\hat{S}_{v,n_2v,n_2}[v_A,n]$ is not true and the correction function (equation 19) cannot be updated. But, since the PSD estimates are obtained by time-averaging, the spectra of the signals are supposed to be similar for neighboring frames. Therefore, at the time-frequency points of active target speech, one can take the correction function estimated at the same frequency bin for the previous frame:

$$f_{Corr}[v_A,n]=f_{Corr}[v_A,n-1], \quad (22)$$

such that $\hat{S}_{v,n_1v,n_1}[v_A,n]+\hat{S}_{v,n_2v,n_2}[v_A,n]$ can be estimated by:

$$\hat{S}_{v,n_1v,n_1}[v_A,n]+\hat{S}_{v,n_2v,n_2}[v_A,n]=f_{Corr}[v_A,n]\cdot\hat{S}_{\tilde{n}\tilde{n}}[v_A,n]. \quad (23)$$

Now, based on the estimated MSC and the estimated noise PSD, the improved common noise estimate can be calculated by:

$$\hat{S}_{\hat{n}\hat{n}}[v,n]=\overline{MSC}[v,n]\cdot(\hat{S}_{v,n_1v,n_1}[v,n]+\hat{S}_{v,n_2v,n_2}[v,n])+(1-\overline{MSC}[v,n])\cdot\hat{S}_{\tilde{n}\tilde{n}}[v,n]. \quad (24)$$

Then, the original speech enhancement filter given by equation 3 can now be recalculated with a noise PSD estimate that obtains a reduced bias:

$$w_{Im\,p}[v,n]=1-\mu\frac{\hat{S}_{\hat{n}\hat{n}}[v,n]}{\hat{S}_{v_1v_1}[v,n]+\hat{S}_{v_2v_2}[v,n]}, \quad (25)$$

where $\hat{S}_{\hat{n}\hat{n}}[v,n]$ is obtained by equation (24).

Evaluation

Figure 3:
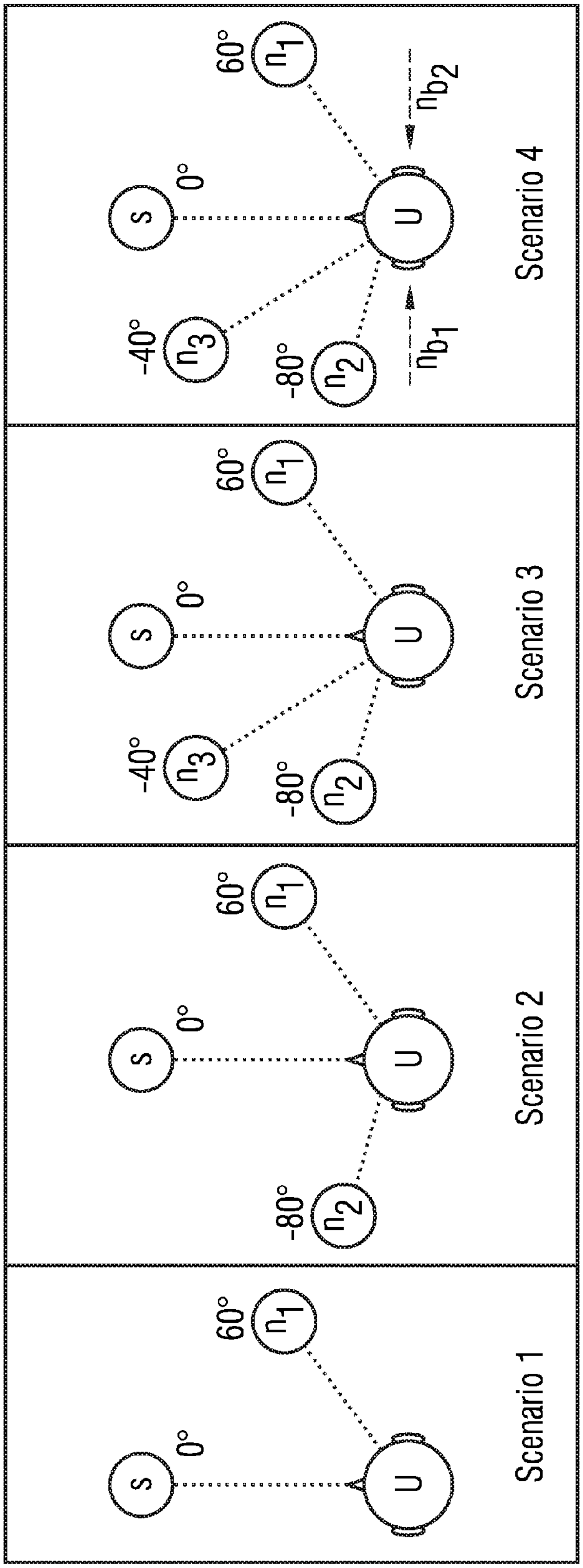

In the sequel, the proposed scheme (FIG. 2) with the enhanced noise estimate (equation 24) and the improved Wiener filter (equation 25) is evaluated in various different scenarios with a hearing aid as illustrated in FIG. 3. The desired target speaker is denoted by s and is located in front of the hearing aid user. The interfering point sources are denoted by $n_i$, $i\in\{1, 2, 3\}$ and background babble noise is denoted by $n_{b_p}$, $p\in\{1, 2\}$. From Scenario 1 to Scenario 3, the number of interfering point sources $n_i$ is increased. In Scenario 4, additional background babble noise $n_{b_p}$ is added (in comparison to Scenario 3).

Corresponding to the scenarios 1 to 4, the SIR (signal-to-interference-ratio) of the input signal decreases from −0.3 dB to −4 dB. The signals were recorded in a living-room-like environment with a reverberation time of about $T_{60}\approx300$ ms. In order to record these signals, an artificial head was equipped with Siemens Life BTE hearing aids without processors. Only the signals of the frontal microphones of the hearing aids were recorded. The sampling frequency was 16 kHz and the distance between the sources and the center of the artificial head was approximately 1.1 m.

Figure 4:
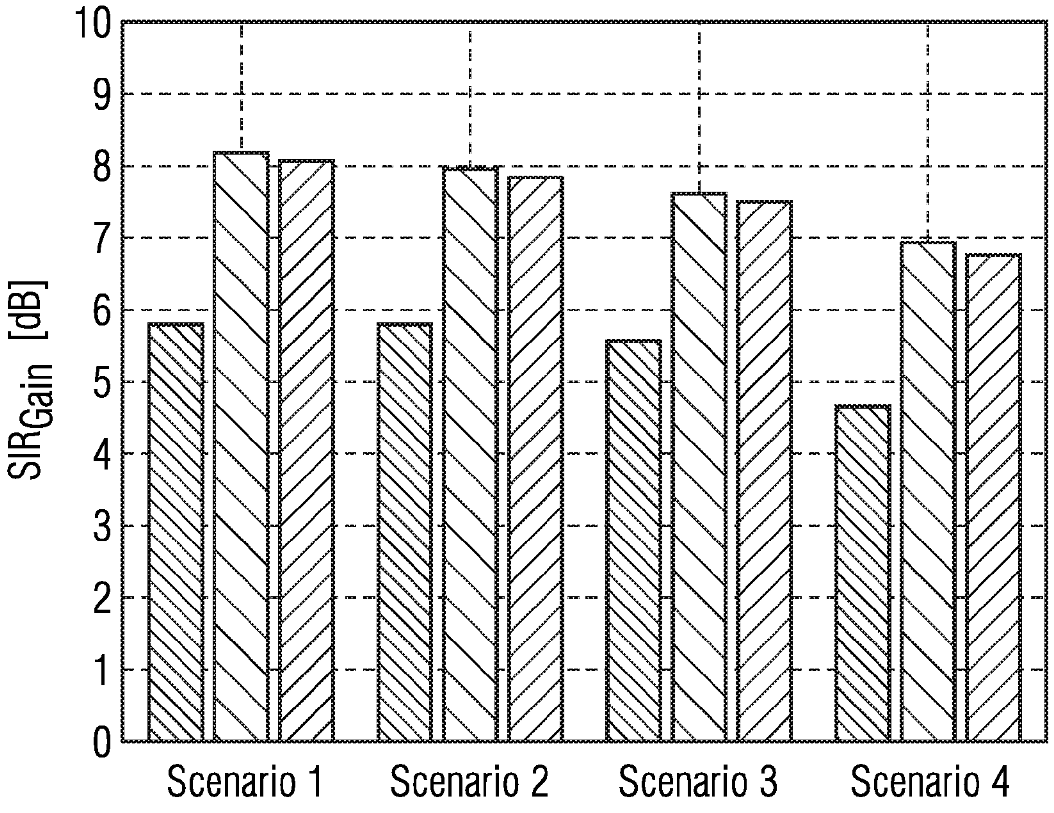

FIG. 4 illustrates the SIR improvement for a living-room-like environment ($T_{60}\approx300$ ms) and 256 subbands. The SIR improvement is defined by $$SIR_{gain}=\frac{1}{2}\sum_{p=1}^{2}\left(SIR_{out_p}-SIR_{in_p}\right)dB \quad (26)$$

$$=\frac{1}{2}\sum_{p=1}^{2}\left(\frac{\sigma^2_{s_{out_p}}}{\sigma^2_{n_{out_p}}}-\frac{\sigma^2_{s_{in_p}}}{\sigma^2_{n_{in_p}}}\right)dB. \quad (27)$$

$\sigma^2_{s_{out_p}}$ and $\sigma^2_{n_{out_p}}$ represent the (long-time) signal power of the speech components and the residual noise and interference components at the output of the proposed scheme (FIG. 2), respectively.

$\sigma^2_{s_{in_p}}$ and $\sigma^2_{n_{in_p}}$ represent the (long-time) signal power of the speech components and the noise and interference components at the input.

The first column in FIG. 4 for each scenario shows the SIR improvement obtained for the scheme depicted in FIG. 1 without the proposed method for bias reduction. The noise estimate is obtained by equation 2 and the spectral weights $b_p[v,n]$, $p\in\{1, 2\}$ are obtained by using a BSS-based algorithm. The spectral weights for the speech enhancement filter are obtained by equation 3. The second column in FIG. 4 represents the maximum performance achieved by the invented method to reduce the bias of the common noise estimate (equations 13 and 25). Here, it is assumed that all terms that in reality need to be estimated are known. The last column depicts the SIR improvement achieved by the invented approach with the estimated MSC (equations 17 and 18), the estimated noise PSD (equation 24), and the improved speech enhancement filter given by equation 25. It should be noted that the target VAD for each time-frequency bin is still assumed to be ideal. It can be seen that the proposed method can achieve about 2 to 2.5 dB maximum improvement compared to the original system, where the bias of the common noise PSD is not reduced. Even with the estimated terms (last column), the proposed approach can still achieve an SIR improvement close to the maximum performance.

These results show that the novel method for reducing the noise bias of the common noise estimate according to the invention works well in practical applications and achieves a high improvement compared to an approach in which the noise PSD estimation bias is not taken into account.

The invention claimed is:

1. A method for determining a bias reduced noise and interference estimation in a binaural microphone configuration, the method which comprises:

receiving with the binaural microphone configuration a right microphone signal and a left microphone signal during a time-frame with a target speaker active;

determining an auto power spectral density estimate of a common noise containing noise components and interference components of the right and left microphone signals; and modifying the auto power spectral density estimate of the common noise by using an estimate of a magnitude squared coherence of the noise components and interference components contained in the right and left microphone signals determined during a time frame without a target speaker active.

2. The method according to claim 1, which comprises calculating the magnitude squared coherence estimate MSC as $$MSC = \frac{|\hat{S}_{v,n_1v,n_2}|^2}{\hat{S}_{v,n_1v,n_1}\hat{S}_{v,n_2v,n_2}},$$

where:

$\hat{S}_{v,n_1v,n_2}$ is a cross power spectral density of the estimated noise and interference components computed by a blocking matrix from filtered noise and interference components contained in the right and left microphone signals;

$\hat{S}_{v,n_1v,n_1}$ is the auto power spectral density of the noise and interference components contained in the right microphone signal filtered by the blocking matrix; and $\hat{S}_{v,n_2v,n_2}$ is the auto power spectral density of the noise and interference components contained in the left microphone signal filtered by the blocking matrix.

3. The method according to claim 1, which comprises calculating the bias reduced auto power spectral density estimate $\hat{S}_{\hat{n}\hat{n}}$ of the common noise as $$\hat{S}_{\hat{n}\hat{n}}=MSC\cdot(\hat{S}_{v,n_1v,n_1}+\hat{S}_{v,n_2v,n_2})+(1-MSC)\cdot\hat{S}_{\hat{n}\hat{n}},$$

where $\hat{S}_{\hat{n}\hat{n}}$ is the auto power spectral density estimate of the common noise.

4. A method for a bias reduced noise and interference estimation in a binaural microphone configuration with a right microphone signal and a left microphone signal, the method which comprises:

at time frames with a target speaker inactive, calculating the bias reduced auto power spectral density estimate $\hat{S}_{\hat{n}\hat{n}}$ as $$\hat{S}_{\hat{n}\hat{n}}=\hat{S}_{v,n_1v,n_1}+\hat{S}_{v,n_2v,n_2}$$

where $\hat{S}_{v,n_1v,n_1}$ is the auto power spectral density of the noise and interference components contained in the right microphone signal filtered by the blocking matrix; and $\hat{S}_{v,n_2v,n_2}$ is the auto power spectral density of the noise and interference components contained in the left microphone signal filtered by the blocking matrix; and at time frames with the target speaker active, carrying out the method according to claim 1 to determine the bias reduced auto power spectral density estimate $\hat{S}_{\hat{n}\hat{n}}$.

5. The method according to claim 4, which comprises determining the bias reduced auto power spectral density estimate in different frequency bands.

6. The method according to claim 1, which comprises determining the bias reduced auto power spectral density estimate in different frequency bands.

7. A speech enhancement method, which comprises:

providing a speech enhancement filter; and performing the method according to claim 1 for determining a bias reduced auto power spectral density estimate; and utilizing the bias reduced auto power spectral density estimate for calculating filter weights of the speech enhancement filter.

8. A speech enhancement method, which comprises:

providing a speech enhancement filter; and performing the method according to claim 4 for determining a bias reduced auto power spectral density estimate; and utilizing the bias reduced auto power spectral density estimate for calculating filter weights of the speech enhancement filter.

9. An acoustic signal processing system for a bias reduced noise and interference estimation at a timeframe with a target speaker active, comprising:

a binaural microphone configuration including a right microphone and a left microphone respectively outputting a right microphone signal and a left microphone signal;

a power spectral density estimation unit connected to receive the right and left microphone signals from said binaural microphone configuration and configured for determining an auto power spectral density estimate of a common noise containing noise and interference components of the right and left microphone signals; and a bias reduction unit connected to said power spectral density estimation unit and configured for modifying the auto power spectral density estimate of the common noise by using an estimate of a magnitude squared coherence of the noise and interference components contained in the right and left microphone signals determined at a time frame without a target speaker active.

10. The acoustic signal processing system according to claim 9, wherein the bias reduced auto power spectral density estimate $\hat{S}_{\hat{n}\hat{n}}$ of the common noise is calculated as $$\hat{S}_{\hat{n}\hat{n}}=MSC\cdot(\hat{S}_{v,n_1v,n_1}+\hat{S}_{v,n_2v,n_2})+(1-MSC)\cdot\hat{S}_{\hat{n}\hat{n}},$$

where

MSC is the magnitude squared coherence of the noise and interference components;

$\hat{S}_{\hat{n}\hat{n}}$ is the auto power spectral density estimate of the common noise estimate;

$\hat{S}_{v,n_1v,n_1}$ is the auto power spectral density of the noise and interference components contained in the right microphone signal filtered by a blocking matrix; and $\hat{S}_{v,n_2v,n_2}$ is the auto power spectral density of the noise and interference components contained in the left microphone signal filtered by the blocking matrix.

11. The acoustic signal processing system according to claim 10, which comprises a speech enhancement filter with filter weights that are calculated by using the bias reduced auto power spectral density estimate.

12. The acoustic signal processing system according to claim 9, which comprises a speech enhancement filter with filter weights that are calculated by using the bias reduced auto power spectral density estimate.

13. A hearing aid, comprising the acoustic signal processing system according to claim 9.

14. A computer program product, comprising a non-transitory computer program with computer-executable software means configured to execute the method according to claim 1 when the computer program is loaded onto and executed in a processing unit.

* * * * *